US012810672B2

(12) United States Patent
Turner

(10) Patent No.: US 12,810,672 B2
(45) Date of Patent: Nov. 24, 2026

(54) SYSTEM AND METHOD FOR A SMART SAFETY DOOR

(71) Applicant: Bradley E. Turner, Statesville, NC (US)

(72) Inventor: Bradley E. Turner, Statesville, NC (US)

( * ) Notice: Subject to any disclaimer, the term of this patent is extended or adjusted under 35 U.S.C. 154(b) by 8 days.

(21) Appl. No.: 19/193,128

(22) Filed: Apr. 29, 2025

(65) Prior Publication Data

US 2025/0336250 A1 Oct. 30, 2025

Related U.S. Application Data

(60) Provisional application No. 63/639,879, filed on Apr. 29, 2024.

(51) Int. Cl.
*G07C 9/00* (2020.01)

(52) U.S. Cl.
CPC ....... *G07C 9/00571* (2013.01); *G07C 9/0073* (2013.01); *G07C 2009/00587* (2013.01); *G07C 9/00944* (2013.01)

(58) Field of Classification Search
None
See application file for complete search history.

(56) References Cited

U.S. PATENT DOCUMENTS

| | | | | |
|---|---|---|---|---|
| 9,643,722 | B1 | 5/2017 | Myslinski | |
| 10,183,749 | B2 | 1/2019 | Myslinski | |
| 11,790,741 | B2 | 10/2023 | Williams | |
| 12,222,192 | B2 * | 2/2025 | Eloyan | H04W 4/44 |
| 2012/0077431 | A1 * | 3/2012 | Fyke | H04W 4/80 455/41.1 |
| 2018/0165631 | A1 * | 6/2018 | Romero | G08B 13/19665 |
| 2019/0206164 | A1 * | 7/2019 | Chae | G07C 9/32 |
| 2020/0364998 | A1 | 11/2020 | Williams | |
| 2023/0125619 | A1 * | 4/2023 | Li | G08B 21/24 340/5.7 |
| 2024/0029319 | A1 * | 1/2024 | Ouellette | G06T 7/70 |

* cited by examiner

*Primary Examiner* — Muhammad Adnan
(74) *Attorney, Agent, or Firm* — Boudwin Intellectual Property Law, LLC; Daniel Boudwin

(57) ABSTRACT

A system and method for a smart safety door is utilized in a person's home that is used in combination with a home security system. The overall system includes a server system with a processor system, a communications interface, a communications system, the server system having access to a communications network, a memory system with an operating system, and a non-transitory storage media for using a smart safety door system, the memory system is in communication with the server system through the communications network. The smart safety door system includes a frame designed to absorb energy and not fail, a locking system that includes a plurality of bolts that each extend in different directions, a smart door, a camera system having a view directly outside of the smart door, and a display screen disposed built into an inside facing of the smart door.

22 Claims, 5 Drawing Sheets

SYSTEM AND METHOD FOR A SMART SAFETY DOOR

CROSS-REFERENCE TO RELATED APPLICATIONS

This application claims the benefit of U.S. Provisional Application No. 63/639,879 filed on Apr. 29, 2024. The above identified patent application is herein incorporated by reference in its entirety to provide continuity of disclosure.

BACKGROUND OF THE INVENTION

Field of the Invention

The present invention relates to a system and method for a safety door. More specifically, the present invention relates to a system and method for a smart safety door.

Description of the Related Art

Nothing is more important to a homeowner than being safe and secure. There is a certain peace of mind that comes with being safe and secure in a person's own home.

What is needed is a system and method for a smart safety door that is utilized in a person's home that is used in combination with a home security system.

BRIEF SUMMARY OF THE INVENTION

The present invention relates to a system and method for a safety door. More specifically, the present invention relates to a system and method for a smart safety door.

The smart safety door system includes a server system with a processor system, a communications interface, a communications system, an input system and an output system, the server system having access to a communications network, a memory system with an operating system, a communications module, a web browser module, a web server application and a non-transitory storage media for using the smart safety door system, the memory system is in communication with the server system through the communications network, and a smart safety door in electrical communication with the server system via the communications network.

It is an object of the present invention to provide a smart safety door system that is used in combination with a home security system.

It is an object of the present invention to provide a smart safety door system that is used in combination with a drone that is used in combination with or without the home security system.

It is an object of the present invention to provide a smart safety door system that allows a user to have a view outside of the smart door while staying safely within a house.

It is an object of the present invention to provide a smart safety door system that serves as a central information hub for everyone who lives in the house being protected by the smart safety door system.

It is an object of the present invention to provide a smart safety door system that recognizes each member of a family living in the house protected by the safety smart door system or approved visitors to allow for keyless entry.

It is an object of the present invention to provide a smart safety door system that offers a panic button feature with both a local alarm and an automatic dial-up 911 feature.

It is an object of the present invention to provide a smart safety door system that automatically synchronizes all data shared within the smart safety door system.

It is an object of the present invention to provide a smart safety door system that obtains information by just passing through the smart door.

It is an object of the present invention to provide a smart safety door system that includes a mobile app having a monthly fee based subscription platform that is one price for each home and is shared by all residents of the protected house.

It is an object of the present invention to provide a smart safety door system that accommodate multiple doors in a single location.

DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
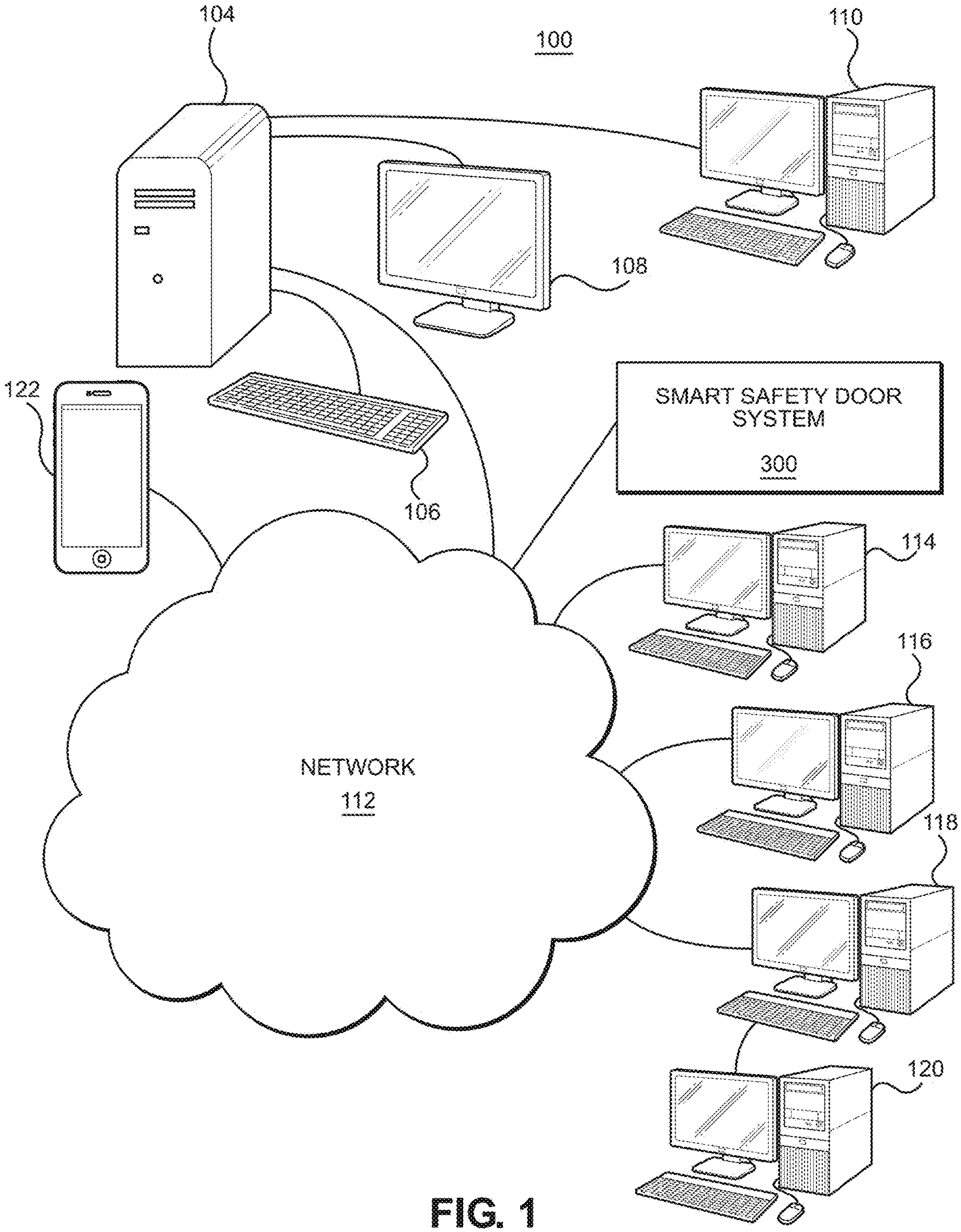
FIG. 1 shows a system overview of a smart safety door system.

Referring now to FIG. 1 there is shown a system overview of a system for using a smart safety door system 100.

The overall system 100 includes a server system 104, an input system 106, an output system 108, a plurality of client systems 110, 114, 116, 118 and 120, a communications network 112, a hand-held device 122 and a smart safety door 300. In other embodiments, the overall system 100 may include additional components and/or may not include all of the components listed above.

The server system 104 may include one or more servers. One server 104 may be the property of the distributor of any related software or non-transitory storage media. In other embodiments, the overall system 100 may include additional components and/or may not include all of the components listed above.

The input system 106 may be used for entering input into the server system 104, and may include any one of, some of, any combination of, or all of a keyboard system, a mouse system, a track ball system, a track pad system, a plurality of buttons on a handheld system, a scanner system, a wireless receiver, a microphone system, a connection to a sound system, and/or a connection and/or an interface system to a computer system, an intranet, and/or the Internet (i.e., IrDA, USB), for example.

The output system 108 may be used for receiving output from the server system 104, and may include any one of, some of, any combination of or all of a monitor system, a wireless transmitter, a handheld display system, a printer system, a speaker system, a connection or an interface system to a sound system, an interface system to one or more peripheral devices and/or a connection and/or an interface system to a computer system, an intranet, and/or the Internet, for example.

The overall system 100 may illustrate some of the variations of the manners of connecting to the server system 104, which may be an information providing website (not shown). The server system 104 may be directly connected and/or wirelessly connected to the plurality of client systems 110, 114, 116, 118 and 120 and are connected via the communications network 112. Client systems 120 may be connected to the server system 104 via the client system 118. The communications network 112 may be any one of, or any combination of, one or more local area networks or LANs, wide area networks or WANs, wireless networks, telephone networks, the Internet and/or other networks. The communications network 112 may include one or more wireless portals (not shown). The client systems 110, 114, 116, 118, and 120 are any system that an end user may use to access the server system 104. For example, the client systems 110, 114, 116, 118, and 120 may be personal computers, workstations, laptop computers, game consoles, handheld network enabled audio/video players and/or any other network appliance.

The client system 120 may access the server system 104 via the combination of the communications network 112 and another system, which in this example is the client system 118. The client system 120 may be an example of a handheld wireless device 122, such as a mobile phone or a handheld network enabled audio/music player or the like, which may also be used for accessing network content.

Figure 3:
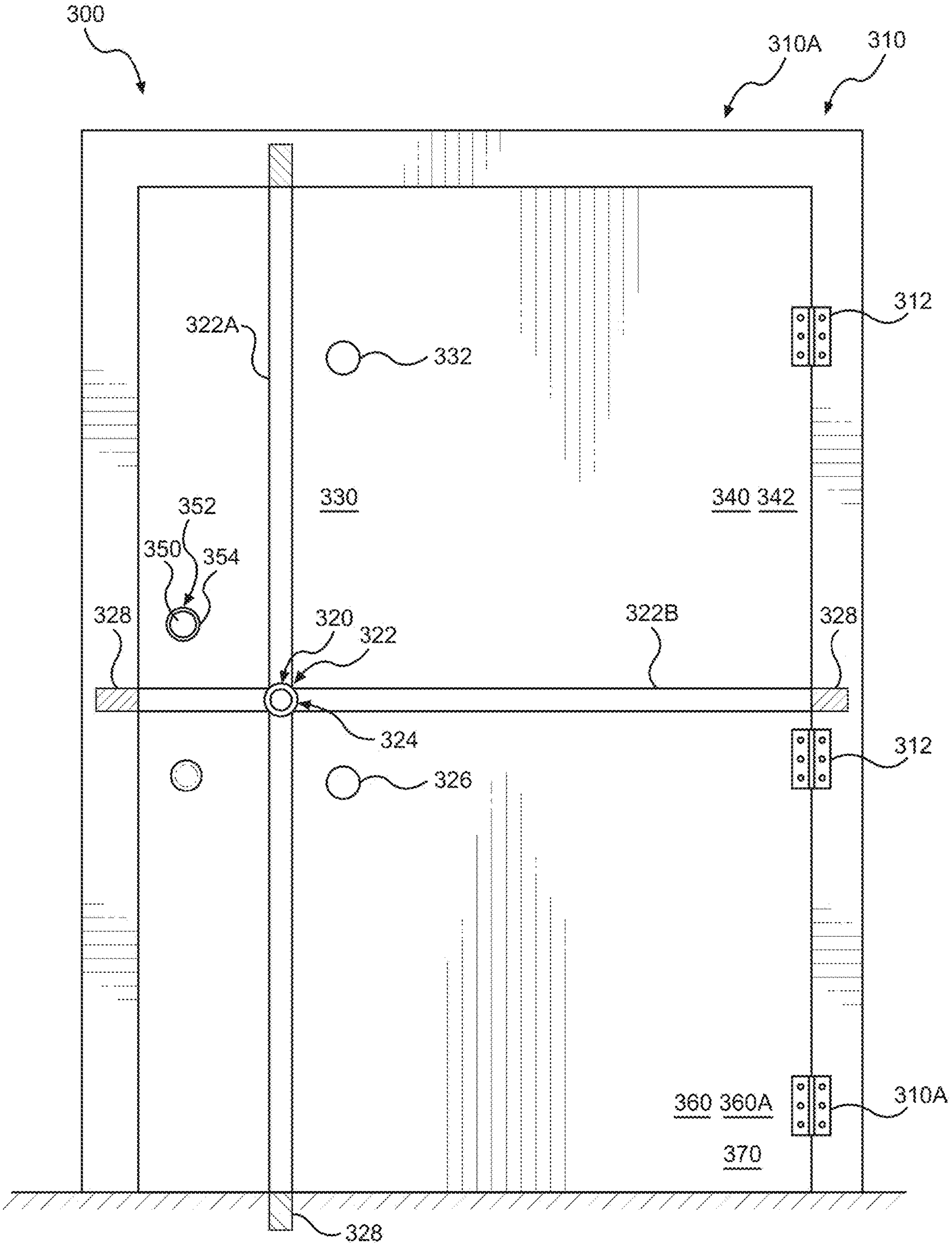
FIG. 3 shows a front overview of a smart safety door system.

The smart safety door 300 is described in more detail in FIG. 3.

Figure 2A:
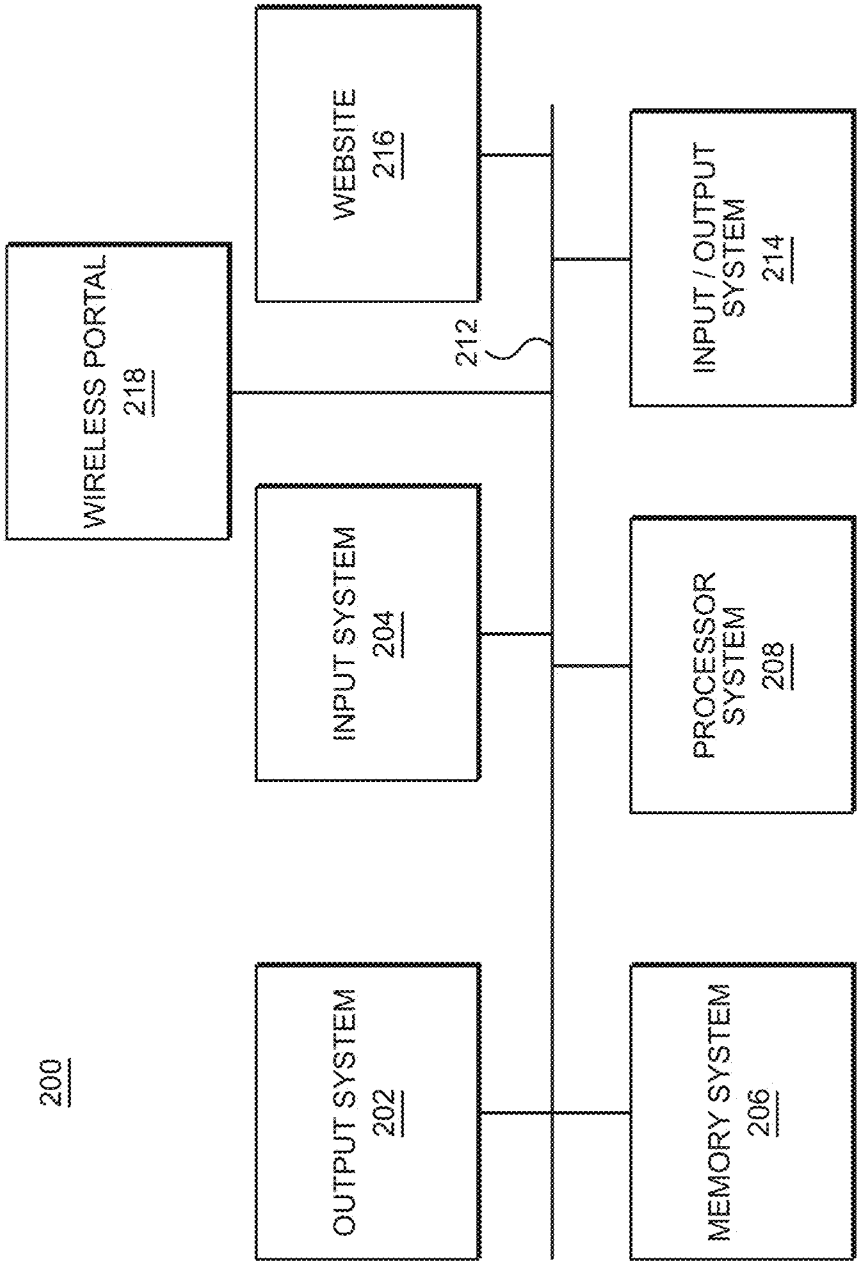
FIG. 2A shows a block diagram of a client system of a smart safety door system.

Referring now to FIG. 2A, there is shown a block diagram of a client system 200 of the system for using a smart safety door system 100.

The client system 200 may include an output system 202, an input system 204, a memory system 206, a processor system 208, a communications system 212, an input/output system 214, a website 216, and a wireless portal 218. Other embodiments of the client system 200 may not have all of the components and/or may have other embodiments in addition to or instead of the components listed above.

The client system 200 may be any one of the client systems 110, 114, 116, 118, 120, and/or handheld wireless device 122 that may be used as one of the network devices of FIG. 1. In other embodiments, the client system 200 may include additional components and/or may not include all of the components listed above. The output system 202 may include any one of, some of, any combination of or all of a monitor system, a wireless transmitter, a handheld display system, a printer system, a speaker system, a connection or an interface system to a sound system, an interface system to peripheral devices and/or a connection and/or an interface system to a computer system, an intranet, and/or the Internet, for example.

The input system 204 may include any one of some of, any combination of or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (i.e., Infrared Data Association or IrDA, Universal Serial Bus or USB), for example. The memory system 206 may include, for example, any one of, some of, any combination of or all of a long-term storage system, such as a hard drive, a short-term storage system, such as a random-access memory; a removable storage system, such as a floppy drive or a removable drive, and/or a flash memory. The memory system 206 may include one or more machine-readable mediums that may store a variety of different types of information. The term machine-readable medium is used to refer to any medium that is structurally configured for carrying information in a format that is readable by a machine. One example of a machine-readable medium is a computer-readable medium. The memory system 206 also stores a non-transitory storage media for using a smart safety door system 255.

The processor system 208 may include any one of, some of, any combination of, or all of multiple parallel processors, a single processor, a system of processors having one or more central processors and/or one or more specialized processors dedicated to specific tasks. The processor system 208 implements the programs stored in the memory system 206. The communications system 212 communicatively buttons the output system 202, the input system 204, the memory system 206, the processor system 208, and/or the input/output system 214 to each other. The communications system 212 may include any one of, some of, any combination of, or all of one or more electrical cables, fiber optic cables, and/or means for sending signals through air or water (i.e., wireless communications), or the like. Some examples of means for sending signals through air and/or water include systems for transmitting electromagnetic waves such as infrared and/or radio waves and/or systems for sending sound waves.

The input/output system 214 may include devices that have the dual function as input and output devices. For example, the input/output system 214 may include one or more touch sensitive screens, which display an image and therefore are an output device and accept input when the screens are pressed by a finger or a stylus, for example. The touch sensitive screens may be sensitive to heat, capacitance and/or pressure. One or more of the input/output devices may be sensitive to a voltage or a current produced by a stylus, for example. The input/output system 214 is optional and may be used in addition to or in place of the output system 202 and/or the input device 204.

The client systems 110, 114, 116, 118, 120 and the handheld wireless device 122 may also be tied into a website 216 or a wireless portal 218 which is also tied directly into the communications system 212. Any website 216 or wireless portal 218 would also include software and a website module (no number) to maintain, allow access to and run the website as well.

Figure 2B:
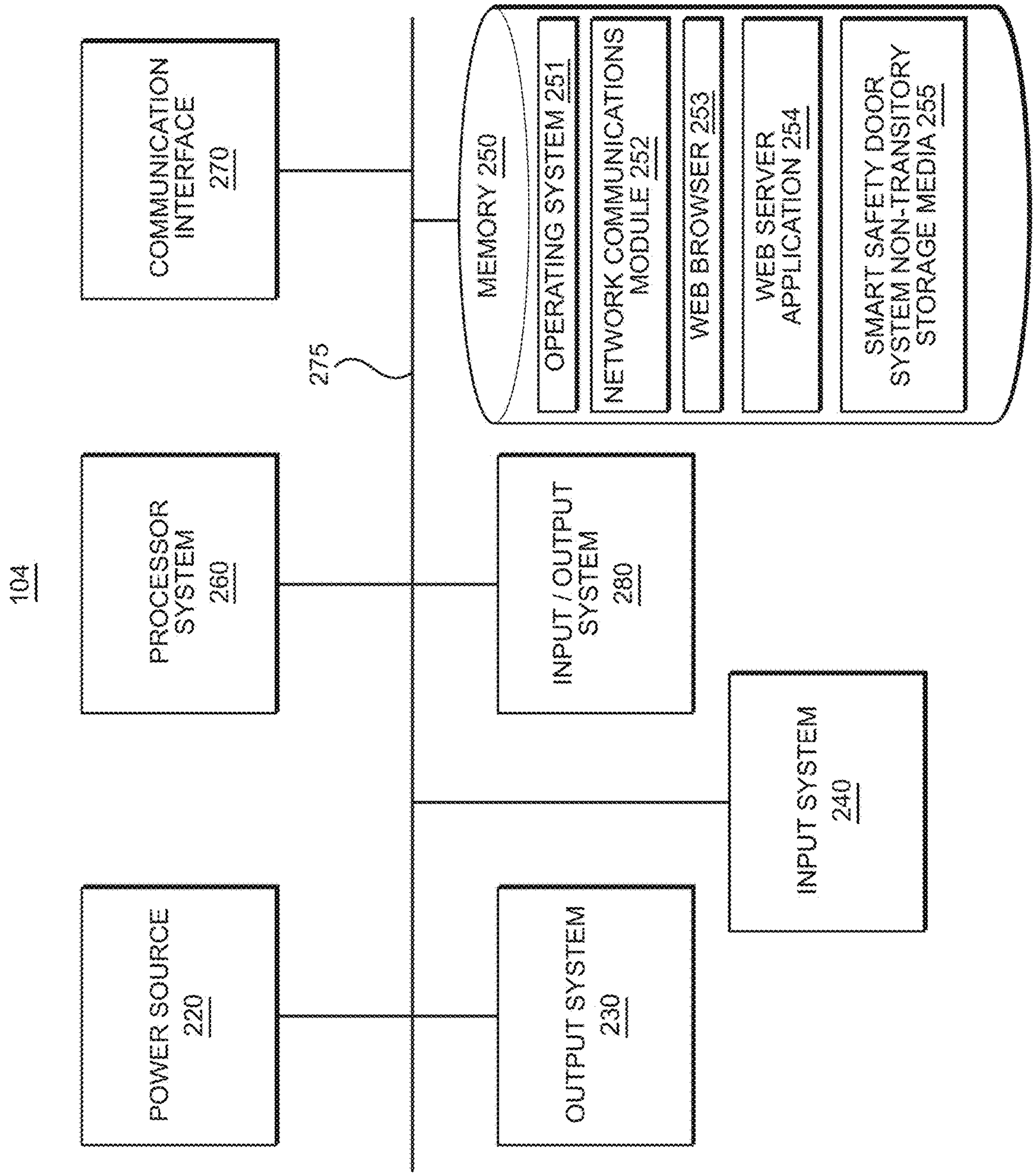
FIG. 2B illustrates a block diagram of a server system of a smart safety door system.

FIG. 2B shows a block diagram of a server system 104 of the system for using a smart safety door system 100.

The server system 104 may include a power source 220, an output system 230, an input system 240, a memory system 250, which may store an operating system 251, a communications module 252, a web browser module 253, a web server application 254, and a non-transitory storage media for using a smart safety door system 255. The server system 104 may also include a processor system 260, a communications interface 270, a communications system 275 and an input/output system 280. In other embodiments, the server system 104 may include additional components and/or may not include all of the components listed above.

The output system 230 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet, for example.

The input system 240 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (i.e., IrDA, USB), for example.

The memory system 250 may include, for example, any one of, some of, any combination of, or all of a long-term storage system, such as a hard drive; a short-term storage system, such as random-access memory; a removable storage system, such as a floppy drive or a removable drive and/or a flash memory. The memory system 250 may include one or more machine-readable mediums that may store a variety of different types of information. The term machine-readable medium is used to refer to any medium capable of carrying information that is readable by a machine. One example of a machine-readable medium is a computer-readable medium. The memory system 250 may store one or more machine instructions for reading, searching and enhancing a system and method for using a smart safety door system 100. The operating system 251 controls all software or non-transitory storage media and hardware of the overall system 100. The communications module 252 may enable the server system 104 to communicate on the communications network 112. The web browser module 253 allows for browsing the Internet. The web server application 254 serves a plurality of web pages to client systems that request the webpages, thereby facilitating browsing on the Internet.

The processor system 260 may include any one of, some of, any combination of, or all of multiple parallel processors, a single processor, a system of processors having one or more central processors and/or one or more specialized processors dedicated to specific tasks. The processor system 260 may implement the machine instructions stored in the memory system 250.

In an alternative embodiment, the communication interface 270 allows the server system 104 to interface with the network 112. In this embodiment, the output system 230 sends communications to the communication interface 270. The communications system 275 communicatively buttons the output system 230, the input system 240, the memory system 250, the processor system 260 and/or the input/output system 280 to each other. The communications system 275 may include any one of, some of, any combination of, or all of one or more electrical cables, fiber optic cables, and/or sending signals through air or water (i.e., wireless communications), or the like. Some examples of sending signals through air and/or water include systems for transmitting electromagnetic waves such as infrared and/or radio waves and/or systems for sending sound waves.

The input/output system 280 may include devices that have the dual function as the input and output devices. For example, the input/output system 280 may include one or more touch sensitive screens, which display an image and therefore are an output device and accept input when the screens are pressed by a finger or a stylus, for example. The touch sensitive screens may be sensitive to heat and/or pressure. One or more of the input/output devices may be sensitive to a voltage or a current produced by a stylus, for example. The input/output system 280 is optional and may be used in addition to or in place of the output system 230 and/or the input device 240.

Referring to FIG. 3, there is a front view of a smart safety door 300.

The smart safety door 300 may include a frame 310, a locking mechanism 320, a smart door 330, a touch screen 340, a panic button 350, a drone 360, and a mobile app 370.

The frame 310 may be a central information hub for all who are adapted to live in a house (not shown) and may be made of a reinforced aluminum frame or the like and is designed to absorb a lot of energy but not fail. The locking mechanism 320 may be a four-part locking mechanism 322 having a vertical deadbolt 322A and a horizontal deadbolt 322B that bolts in several directions, side to side and top to bottom. The smart door 330 may allow a view of the outside of the smart door 330 via a camera 332 and may recognize each member of the family or approved visitors to allow for keyless entry. The touch screen 340 may be a relatively large Light Emitting Diode or LED touch screen 342 visible and built into an interior facing of the smart door 330. The panic button 350 may be disposed on the outside of the smart door 340 and offers both an alarm feature 352 and an auto 911 feature 354, because of emergency security situations occurring at the entrance to the home. The drone 360 may be a mini-drone 360A or the like that may be part of the smart door 330, attached to the smart door 330, built into the smart door 330, or be somewhere separate from the smart door 330 a predetermined distance that may be approximately 15 feet away or the like. The drone 360 may be deployed to track somebody down such as an intruder or the like. The drone 360 may also be disposed on one or both sides of the inside and/or the outside of the smart door 330. The drone 360 may also operate separately from the overall system 100. The mobile app 370 may be the operating system for the smart safety door 300 and will be on a monthly fee based subscription platform that is one price for each home and shared by all residents of the home.

As a person passes through the frame 310 of the smart safety door 300, all shared data such as grocery lists and schedules from each person are automatically synced. All information that is essential to the household will be shared by just passing through the frame 310 of the smart safety door 300. The locking mechanism 320 may be an electromagnetic lock 324 that is disposed around a perimeter 310A of the frame 310 and one or more hinges 312, which would need a battery backup 326. A plurality of magnet blocks 328 would be disposed around the perimeter 310A of the frame 310, not the perimeter 310A of the frame 310, with 2 magnet blocks 328 or the like disposed on top of the perimeter 310A of the frame 310 and bottom of the perimeter 310A of the frame 310 and 4 magnet blocks 328 on each side of the perimeter 310A of the frame 310 and a plurality of recessed magnet blocks 328 recessed into the smart door 330 and into the frame 310. The smart safety door 300 may also accommodate multiple smart doors 330 in a single location or the like.

Figure 4:
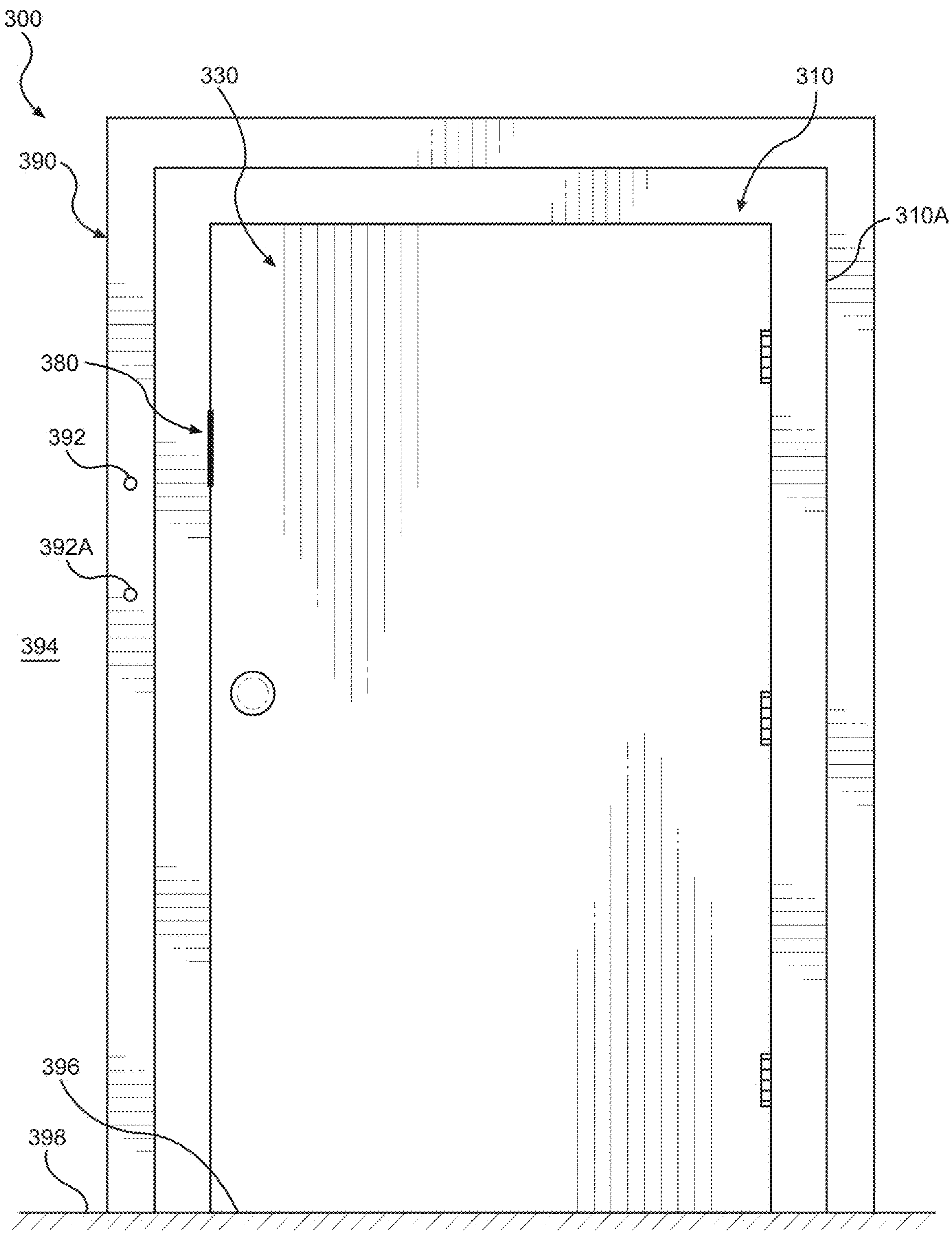
FIG. 4 shows a rear overview of a smart safety door system.

FIG. 4 shows a rear overview of a smart safety door system 300.

The smart safety door 300 may include the frame 310, a plurality of electromagnetic strips 380, and an additional flange 390.

The frame 310 may be made of steel or the like and is designed to absorb a lot of energy but not fail. The electromagnetic strips 380 may be disposed around the perimeter 310A of the frame 310 to secure locking the smart door 330 to the frame 310. More specifically, the electromagnetic strips 380 may be disposed an equidistance apart around the perimeter 310A of the frame 310 for a relatively more evenly secured locking of the smart door 330 to the frame 310. The additional flange 390 may be disposed around the perimeter 310A of the frame 310 and may be adapted to be secured with a plurality of fasteners 392 such as a plurality of screws 392A or the like into an adjacent wall 394 for additional security. The additional flange 390 may include a reinforced sill plate 396 secured to the additional flange 390 with a high strength epoxy 398 or the like. The additional flange 390 may be made of steel or the like and is designed to absorb a lot of energy but not fail.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A smart safety door system comprising:

a server comprising a processor and a communication interface to communicate via a network;

a smart door, including a frame, in communication with the server and a client system via the network; and the client system comprising an operating system for the smart door, a communication module to communicate with the server and the smart door via the network, and a non-transitory storage media storing instructions for operation of the smart door;

wherein a shared data with household members is automatically synchronized with a device when a person from the household members carrying the device walks through the frame of the smart door.

2. The smart safety door system according to claim 1, wherein the client system is selected from the group consisting of a desktop computer, a laptop computer, a tablet computer, or a smart phone.

3. The smart safety door system according to claim 1, wherein the smart door includes, a locking mechanism, a smart door, a touch screen, a panic button, a plurality of electromagnetic strips, and an additional flange.

4. The smart safety door system according to claim 3, wherein the frame is a central information hub.

5. The smart safety door system according to claim 3, wherein the frame is made of a reinforced aluminum or steel and is designed to absorb a lot of energy but not fail.

6. The smart safety door system according to claim 3, wherein the locking mechanism is a four-part locking mechanism having a vertical deadbolt and a horizontal deadbolt that bolts in several directions, including side to side, and top to bottom directions.

7. The smart safety door system according to claim 3, wherein the locking mechanism is an electromagnetic lock that is disposed around a perimeter of the frame and one or more hinges.

8. The smart safety door system according to claim 7, wherein the electromagnetic lock includes a battery backup.

9. The smart safety door system according to claim 7, wherein the electromagnetic lock further comprising a plurality of magnet blocks that are disposed around the perimeter of the frame.

10. The smart safety door system according to claim 3, wherein the smart door allows a view of the outside of the smart door via a camera that is adapted to recognize each member of a family or one or more approved visitors to allow for keyless entry.

11. The smart safety door system according to claim 3, wherein the touch screen is an LED touch screen that is visible and built into an interior facing of the smart door.

12. The smart safety door system according to claim 3, wherein the panic button is disposed on the outside of the smart door and offers both an alarm feature and an auto 911 dialing feature, in case of an emergency security situations occurring at entrance of the home.

13. The smart safety door system according to claim 3, wherein electromagnetic strips are disposed an equidistance apart around the perimeter of the frame for evenly secured locking of the smart door to the frame.

14. The smart safety door system according to claim 4, wherein the additional flange is disposed around the perimeter of the frame and is adapted to be secured with a plurality of fasteners into an adjacent wall for additional security.

15. The smart safety door system according to claim 14, wherein the fasteners are a plurality of screws.

16. The smart safety door system according to claim 3, wherein the additional flange includes a reinforced sill plate secured to the additional flange with a high strength epoxy.

17. The smart safety door system according to claim 3, wherein the smart safety door system further includes a drone.

18. The smart safety door system according to claim 17, wherein the drone is a mini-drone that is part of the smart door, attached to the smart door, built into the smart door, or be separate from the smart door at a predetermined distance.

19. The smart safety door system according to claim 17, wherein the drone is deployed to track down an intruder.

20. The smart safety door system according to claim 17, wherein the drone is disposed on one or both sides of the inside and/or the outside of the smart door.

21. The smart safety door system according to claim 17, wherein the drone is operated separately from the smart safety door system.

22. The smart safety door system according to claim 1, wherein the smart safety door system communicates with a mobile application.

* * * * *